Figure 1:
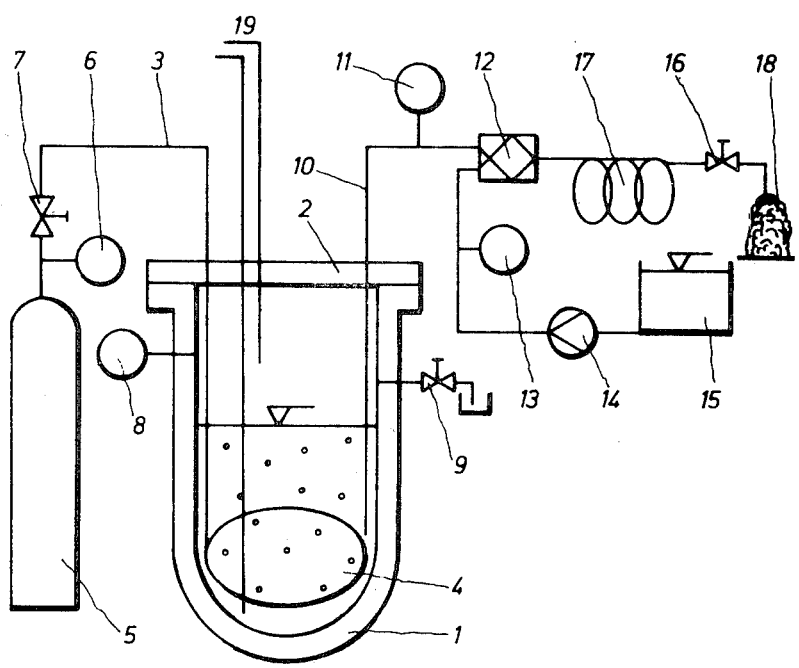

United States Patent [19]

Kloker et al.

[11] 4,120,923
[45] Oct. 17, 1978

[54] PROCESS FOR MANUFACTURING FOAMED MATERIALS INVOLVING CONTACTING A THIN UNBROKEN FILM OF LIQUID RESIN WITH A GASEOUS BLOWING AGENT UNDER PRESSURE

[75] Inventors: Werner Kloker; Franz Bovender; Franz Gromping, all of Krefeld; Leonhard Goerden, Oedt; Harald Niesel, Krefeld, all of Germany

[73] Assignee: Bayer Aktiengesellschaft, Leverkusen, Germany

[21] Appl. No.: 605,026

[22] Filed: Aug. 15, 1975

[30] Foreign Application Priority Data

Aug. 21, 1974 [DE] Fed. Rep. of Germany ....... 2440022

[51] Int. Cl.² ............................................. B29D 27/04
[52] U.S. Cl. .................................... 264/45.3; 261/112; 264/45.8; 264/50; 264/DIG. 2; 264/DIG. 5; 264/DIG. 13; 264/DIG. 17; 521/917; 521/138; 521/178; 521/133; 422/133
[58] Field of Search ............ 264/50, 54, 45.3, DIG. 5, 264/DIG. 13, DIG. 17, DIG. 2, 45.8; 260/2.5 BC, 2.5 BD, 2.5 R, 2.5 F, 2.5 BP, 2.5 N; 23/289, 290; 261/112

[56] References Cited

U.S. PATENT DOCUMENTS

| 265,974 | 10/1882 | Nichols | 261/112 X |
|---|---|---|---|
| 2,195,449 | 4/1940 | Delen | 261/112 X |
| 2,344,560 | 3/1944 | Palkin et al. | 261/112 |
| 2,666,036 | 1/1954 | Schwencke | 264/50 X |
| 2,935,762 | 5/1960 | Walter et al. | 264/50 |
| 2,944,966 | 7/1960 | Eickmeyer | 261/112 X |
| 3,063,952 | 11/1962 | Vibli | 264/50 X |
| 3,220,801 | 11/1965 | Rill et al. | 260/2.5 BC X |
| 3,251,092 | 5/1966 | Printz | 264/54 X |
| 3,278,659 | 10/1966 | Willy | 264/54 |
| 3,318,588 | 5/1967 | Russell et al. | 261/112 X |
| 3,395,193 | 7/1968 | Bruce et al. | 261/112 X |
| 3,468,987 | 9/1969 | Willy | 264/54 X |
| 3,482,947 | 12/1969 | Jacobson et al. | 261/112 X |
| 3,585,786 | 6/1971 | Hardison | 261/112 X |
| 3,796,779 | 3/1974 | Greenberg | 264/50 |

FOREIGN PATENT DOCUMENTS

| 1,504,654 | 5/1969 | Fed. Rep. of Germany. | |
|---|---|---|---|
| 2,017,221 | 12/1971 | Fed. Rep. of Germany | 260/2.5 BD |
| 23,078 of | 1908 | United Kingdom | 261/112 |
| 392,475 | 5/1933 | United Kingdom | 261/112 |
| 935,198 | 8/1963 | United Kingdom | 261/112 |
| 270,765 | 8/1970 | U.S.S.R. | 261/112 |

OTHER PUBLICATIONS

Knox, R. B. "Frothing Processes for Urethane Foams," Dupont: Foam Bulletin (Hylene), Wilmington Del., E. I. Du Pont de Nemours & Co., (Inc.), Jun. 22, 1960, pp. 1-8.

Stengard, R. A. and R. B. Knox, "Improved Frothing Process for Rigid Urethane Foam," Dupont (Hylene) Bulletin: New Information About Urethane Foam, Wilmington, Del., E. I. Du Pont de Nemours & Co., Inc., Aug. 25, 1960, pp. 1-2.

Knox, R. E., "Letdown Valve for Frothing Rigid Foams," Dupont (Hylene) Foam Bulletin, Wilmington, Del., E. I. Du Pont de Nemours & Co., Inc., Sep. 12, 1960, pp. 1-2.

*Primary Examiner*—Philip Anderson
*Attorney, Agent, or Firm*—Connolly and Hutz

[57] ABSTRACT

Stable foams of reaction resins and/or condensation resins can be obtained by adding a blowing agent which is gaseous under normal conditions to the resin under pressure, the gas liquid interface being enlarged while dispensing with moving equipment, allowing the mixture to expand and to cure.

3 Claims, 3 Drawing Figures

PROCESS FOR MANUFACTURING FOAMED MATERIALS INVOLVING CONTACTING A THIN UNBROKEN FILM OF LIQUID RESIN WITH A GASEOUS BLOWING AGENT UNDER PRESSURE

The present invention relates to a process for the manufacture of insulating materials and lightweight construction materials, which can contain fillers, and have been produced from cold-curing or hot-curing reaction resins and/or condensation resins by physical foaming.

DOS (German Published Specification) No. 1,504,654, May 14, 1969 has disclosed a process and a device for the manufacture of foams, for example from mixtures of unsaturated polyesters and monomers containing $>C = CH_2$ groups. According to this process, a suitably viscous liquid mixture, for example, a polyester resin, is mixed in a pressure chamber with a blowing gas or with agents which generate such a gas and are soluble or dispersible in the liquid mixture, during which mixing the mixture remains practically free from bubbles. The nature of the blowing agent should be such that it is absorbed by the mixture at relatively high pressures and relatively low temperatures but forms a foam with the mixture at low pressures and higher temperatures.

From the mixing chamber, the mixture is allowed to issue through a nozzle into a zone of such pressure that foaming occurs. The length to diameter ratio of the nozzle should be between about 1:1 and 5:1. Further characteristics of the device described in the abovementioned application are certain rotating stirring devices containing distributors which direct the flow of liquid in the mixing chamber in such a way that the mixing process takes place uniformly.

As long as the foams have not yet been cured, their dimensional stability is of course limited but can be influenced favourably by surface-active agents. The addition of fillers has hitherto always encountered difficulties, because materials having relatively rough surfaces, as is the case with most fillers, are known to accelerate the collapse of liquid foams so greatly that for this reason the addition of fillers as a rule remained a problem in the case of physically foamed resins.

It was therefore desirable to provide foams manufactured from reaction resins and/or condensation resins, which are stable for a longer time than the previously known foams, especially if fillers are added.

It has now been found, surprisingly, that the stability of reaction resin foams and condensation resin foams can be increased substantially by the process described in more detail below, so that the resulting fine-pored foam can be mixed not only with curing agents and accelerators but also with lightweight fillers and if appropriate also with heavier fillers.

According to the invention there is provided a process for the manufacture of insulating materials and lightweight constructional materials from cold-curable and/or hot-curable reaction resins and/or condensation resins with viscosities of less than 6,000 cP wherein a blowing agent having a boiling point under normal pressure of less than 0° C. is added to the resin in a pressure vessel under a pressure of 3 to 350 bars, at a temperature of between 0° and 50° C. and the mixture is kept under pressure for such a period that the residence time or the average residence time is 0.1 to 120 minutes, the mixture subsequently being allowed to expand, in stages or continuously, and to be cured with a curing agent and the gas-liquid interface is enlarged while avoiding the use of moving equipment.

Preferably, the pressure in the pressure vessel is 20 to 180 bars and the temperature is between 10° and 30° C. The preferred residence time is 0.5 to 30 mins.

The gas-liquid interface may be enlarged by introducing the blowing agent into the resin through a distributor device or by allowing the resin to flow over inserts in the pressure vessel.

Preferably the resin contains auxiliaries, additives, fillers or accelerators and is cured by addition of filler-curing agent combinations.

The invention also includes a process for manufacturing insulating materials and lightweight constructional materials.

The invention also provides the utilization of a device for carrying out the process according to the invention, comprising a stock vessel containing the blowing agent, a stock vessel for the resin or a resin/accelerator mixture, and a stock vessel for the curing agent or a resin/curing agent mixture, leading from each stock vessel, a feed pipeline to a mixing chamber, and at least one pressure vessel having means therein for enlarging the gas-liquid interface, which pressure vessel is connected to the feed pipelines leading from the stock vessel for the resin or for the resin/accelerator mixture and from the stock vessel for the blowing agent, and has an inlet for the resin or for the resin/accelerator mixture. In a preferred embodiment of the device utilized according to the process the feed pipeline leading from the stock vessel for the curing agent or for the resin/curing agent mixture enters the pressure vessel.

The means in the pressure vessel for enlarging the gas-liquid interface may comprise a distributors device for the blowing agent in the lower part of the pressure vessel or inserts in the pressure vessel over which the resin may flow.

The inserts which enlarge the interface can consist, for example, of lamellae.

Preferably the pressure vessel is interposed between, and connected to the feed pipeline leading from, the mixing chamber and the stock vessel for the curing agent or the resin for the resin accelerator mixture curing agent mixture, or the stock vessel.

The following reaction resins and condensation resins can be used in the process according to the invention:

A. Epoxide resins based on epoxide compounds having more than one epoxide group per molecule.

By epoxide compounds with more than one epoxide group per molecule there are understood, for example, aliphatic, cycloaliphatic, aromatic or heterocyclic polyepoxides which on average contain more than one epoxide group per molecule.

The polyepoxide compounds to be used can be polyglycidyl ethers of polyhydric phenols, for example of pyrocatechol, resorcinol or hydroquinone, of 4,4'-dihydroxy-diphenylmethane, of 4,4'-dihydroxy-3,3'-dimethyldiphenyl-methane, of 4,4'-dihydroxydiphenyldimethylmethane (bisphenol A), of 4,4'-dihydroxydiphenylcyclohexane, of 4,4'-dihydroxy-3,3'-dimethyldiphenylpropane, of 4,4'-dihydroxydiphenyl, of 4,4'-dihydroxydiphenylsulphone, of tris-(4-hydroxyphenyl)-methane, of the chlorination and bromination products of the abovementioned diphenols, of novolacs (that is to say of reaction products of monohydric or polyhydric phenols with aldehydes, especially formaldehyde, in the presence of acid catalysts), of diphenols which have been obtained by esterification of 2 mols of the sodium salt of an aromatic hydroxycarboxylic acid with one mol of a dihalogenoalkane or dihalogenodialkyl ether (compare British Pat. No. 1,017,612), or of polyphenols which have been obtained by condensation of phenols and long-chain halogenoparaffins containing at least 2 halogen atoms (compare British Patent Specification No. 1,024,288). Further compounds to be mentioned are: polyepoxide compounds based on aromatic amines and epichlorohydrin, for example N-di-(2,3-epoxypropyl)-aniline, N,N'-dimethyl-N,N'-diepoxypropyl-4,4'-diamino-diphenylmethane, N,N'-tetraepoxypropyl-4,4'-diaminophenylmethane and N-diepoxypropyl-4-aminophenyl-glycidyl-ether (compare British Patent Specifications Nos. 772,830 and 816,923).

It is also possible to use glycidyl esters of polybasic aromatic, aliphatic and cycloaliphatic carboxylic acids, for example phthalic acid diglycidyl esters, especially o-phthalic acid glycidyl esters with more than 5.5 epoxide equivalents per kilogram, adipic acid diglycidyl esters and glycidyl esters of reaction products of 1 mol of an aromatic or cycloaliphatic dicarboxylic acid anhydride and ½ mol of a diol or 1/n mol of a polyol with n hydroxyl groups or hexahydrophthalic acid diglycidyl esters, which can optionally be substituted by methyl groups.

Glycidyl esters of polyhydric alcohols, for example of 1,4-butenediol, glycerol, trimethylolpropane, pentaerythritol and polyethylene glycols can also be used. Triglycidyl isocyanurate, N,N'-diepoxypropyloxamide, polyglycidyl thioethers of polyfunctional thiols, such as, for example, of bis-mercaptomethylbenzene, diglycidyl-trimethylenetrisulphone and polyglycidyl ethers based on hydantoins are also of interest.

Finally, the following should be mentioned: epoxidation products of poly-unsaturated compounds, such as vegetable oils and their conversion products, epoxidation products of diolefins and polyolefines, such as butadiene, vinylcyclohexene, 1,5-cyclooctadiene, 1,5,9-cyclododecatriene and polymers and copolymers which still contain epoxidisable double bonds, for example those based on polybutadiene, polyisoprene, butadiene-styrene copolymers, divinylbenzene, dicyclopentadiene and unsaturated polyesters, and also epoxidation products of olefines which are accessible by a Diels-Alder addition and are subsequently converted into polyepoxides by epoxidation with per-compounds, or epoxidation products of compounds which contain two cyclopentene or cyclohexene rings linked via bridge atoms or bridge atom groups. Polymers of unsaturated monoepoxides, for example off methacrylic acid glycidyl ester or allyl glycidyl ether, should also be mentioned.

Preferably, diglycidyl ethers of bisphenol A, o-phthalic acid diglycidyl esters with more than 5.5 epoxide equivalents per kilogram, m- and p-phthalic acid diglycidyl esters, hexahydrophthalic acid diglycidyl esters and tetrahydrophthalic acid diglycidyl esters are employed.

Compounds which can be used for curing are compounds known as epoxide resin curing agents, such as are described, for example, in Methoden der Organischen Chemie (Methods of Organic Chemistry), (Houben-Weyl), 4th edition, volum 14/2, Georg Thieme Verlag, Stuttgart, 1963, pages 499–532. The preferred curing agents are amines (ibid., pages 516–523).

B. Reactants which give polyurethanes

Starting components which can be employed to make resins for use in the process according to the invention, are aliphatic, cycloaliphatic, araliphatic, aromatic and heterocyclic polyisocyanates, such as are described, for example, by W. Siefgen in Justus Liebigs Annalen der Chemie, 562, pages 75 to 136, for example ethylene-diisocyanate, 1,4-tetramethylene-diisocyanate, 1,6-hexamethylene-diisocyanate, 1,12-dodecane-diisocyanate, cyclobutane-1,3-diisocyanate, cyclohexane-1,3-and -1,4-diisocyanate and any desired mixtures of these isomers, 1-isocyanato-3,3,5-trimethyl-5-isocyanatomethyl-cyclohexane (DAS (German Published Specification) No. 1,202,785), 2,4- and 2,6-hexahydrotoluylene-diisocyanate and any desired mixtures of these isomers, hexahydro-1,3- and/or -1,4-phenylene-diisocyanate, perhydro-2,4'- and/or -4,4'-diphenylmethane-diisocyanate, 1,3- and 1,4-phenylene-diisocyanate, 2,4- and 2,6-toluylene-diisocyanate and any desired mixtures of these isomers, diphenylmethane-2,4'- and/or -4,4'-diisocyanate, naphthylene-1,5-diisocyanate, triphenylmethane-4,4',4''-triisocyanate, polyphenyl-polymethylene-polyisocyanates, such as are obtained by aniline-formaldehyde condensation and subsequent phosgenation and are described, for example, in British Patent Specifications Nos. 874,430 and 848,671, perchlorinated aryl-polyisocyanates, such as are described, for example, in German Auslegeschrift (German Published Specification) No. 1,157,601, polyisocyanates containing carbodiimide groups, such as are described in German Patent Specification No. 1,092,007, diisocyanates, such as are described in U.S. Patent Specification No. 3,492,330, polyisocyanates containing allophanate groups, such as are described, for example, in British Patent Specification No. 994,890, Belgian Patent Specification No. 761,626 and Published Netherlands Patent Application No. 7,102,524, polyisocyanates containing isocyanurate groups, such as are described, for example, in German Patent Specifications Nos. 1,022,789, 1,222,067, and 1,027,394 and in German Offenlegungsschriften (German Published Specifications) Nos. 1,929,034 and 2,004,048, polyisocyanates containing urethane groups, such as are described, for example, in Belgian Patent Specification No. 752,261 or in U.S. Patent Specification No. 3,394,164, polyisocyanates containing acylated urea groups, according to German Patent Specification No. 1,230,778, polyisocyanates containing biuret groups, such as are described, for example, in German Patent Specification No. 1,101,394, in British Patent Specification No. 889,050 and in Frech Patent Specification No. 7,017,514, polyisocyanates prepared by telomerisation reactions, such as are described, for example, in Belgian Patent Specification No. 723,640, polyisocyanates containing ester groups, such as are described, for example, in British Patent Specifications Nos. 956,474 and 1,072,956, in U.S. Patent Specification No. 3,567,763 and in German Patent Specification No. 1,231,688, and reaction products of the abovementioned isocyanates with acetals according to German Patent Specification No. 1,072,385.

It is also possible to employ the distillation residues, containing isocyanate groups, obtained from the industrial manufacture of isocyanates, these residues being dissolved, if appropriate, in one or more of the abovementioned polyisocyanates. It is also possible to use any desired mixtures of the abovementioned polyisocyanates.

As a rule, the industrially easily accessible polyisocyanates are particularly preferred, for example 2,4- and 2,6-toluylene-diisocyanate and any desired mixtures of these isomers ("TDI"), polyphenyl-polymethylene-polyisocyanates, such as are manufactured by aniline-formaldehyde condensation and subsequent phosgenation ("crude MDI") and polyisocyanates containing carbodiimide groups, urethane groups, allophanate groups, isocyanurate groups, urea groups or biuret groups ("modified polyisocyanates").

Further starting compounds to be employed for making resins for use in the process according to the invention are compounds with at least two hydrogen atoms which are reactive towards isocyanates, and with a molecular weight of, as a rule, 400–10,000. By these compounds there are understood compounds containing amino groups, thiol groups or carboxyl groups and, preferably, polyhydroxy compounds, especially compounds containing 2 to 8 hydroxyl groups, particularly those of molecular weight 800 to 10,000, preferably 1,000 to 6,000, for example polyesters, polyethers, polythioethers, polyacetals, polycarbonates and polyesteramides, containing at least two, as a rule 2 to 8, but preferably 2 to 4, hydroxyl groups, such as are in themselves known for the preparation of homogeneous and of cellular polyurethanes.

The polyesters containing hydroxyl groups which can be used are, for example, reaction products of polyhydric, preferably dihydric and optionally additionally thihydric alcohols with polybasic, preferably dibasic, carboxylic acids. Instead of the free polycarboxylic acids it is also possible to use the corresponding polycarboxylic acid anhydrides or corresponding polycarboxylic acid esters of low alcohols, or their mixtures, for the preparation of the polyesters. The polycarboxylic acids can be aliphatic, cycloaliphatic, aromatic and/or heterocyclic and can optionally be substituted, for example by halogen atoms, and/or be unsaturated. As examples of the above there may be mentioned: succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric and trimeric fatty acids such as oleic acid, optionally mixed with monomeric fatty acids, terephthalic acid dimethyl ester and terephthalic acid bis-glycol ester. Examples of polyhydric alcohols which can be used are ethylene glycol, 1,2- and 1,3-propylene glycol, 1,4- and 2,3-butylene glycol, 1,6-hexanediol, 1,8-octanediol, neopentyl glycol, cyclohexanedimethanol (1,4-bis-hydroxymethylcyclohexane), 2-methyl-1,3-propanediol, glycerol, trimethylolpropane, 1,2,6-hexanetriol, 1,2,4-butanetriol, trimethylolethane, pentaerythritol, quinitol, mannitol and sorbitol, methylglycoside and also diethylene glycol, triethylene, glycol, tetraethylene glycol, polyethylene glycols, dipropylene glycol, polypropylene glycols, dibutylene glycol and polybutylene glycols. The polyesters can in part contain terminal carboxyl groups. Polyesters obtained from lactones, for example ε-caprolactone, or hydroxycarboxylic acids, for example ω-hydroxycaproic acid, can also be employed.

The polyethers, containing at least two, as a rule two to eight, preferably two to three, hydroxyl groups, which can be used according to the invention are also of a type which is in itself known and are prepared, for example, by polymerisation of epoxides such as ethylene oxide, propylene oxide, butylene oxide, tetrahydrofurane, styrene oxide or epichlorohydrin with themselves, for example in the presence of $BF_3$, or by addition reaction of these epoxides, optionally mixed with one another or used successively, with starting components with reactive hydrogen atoms, such as alcohols or amines, for example water, ethylene glycol, 1,3- or 1,2-propylene glycol, trimethylolpropane, 4,4'-dihydroxydiphenylpropane, aniline, ammonia, ethanolamine or ethylenediamine. Sucrose polyethers, such as are described, for example, in German Auslegeschriften (German Published Specifications) Nos. 1,176,358 and 1,064,938, can also be used according to the invention. Frequenctly, polyethers are preferred which predominantly (up to 90% by weight, based on all OH groups present in the polyether) contain primary OH groups. Polyethers modified with vinyl polymers, such as are produced, for example, by polymerisation of styrene and acrylonitrile in the presence of polyethers (U.S. Patent Specifications Nos. 3,383,351, 3,304,273, 3,523,093 and 3,110,695 and German Patent Specification No. 1,152,536) are also suitable, as are polybutadienes containing OH groups.

Amongst the polythioethers there should in particular be mentioned the condensation products of thiodiglycol with itself and/or with other glycols, dicarboxylic acids, formaldehyde, aminocarboxylic acids or aminoalcohols. Depending on the co-component, the products are polythio-mixed ethers, polythioether-esters or polythioether-ester-amides.

Polyacetals which can be used are, for example, the compounds which can be prepared from glycols, such as diethylene glycol, triethylene glycol, 4,4'-dihydroxyethoxy-diphenyldimethylmethane or hexanediol, and formaldehyde. Polyacetals which are suitable for use according to the invention can also be prepared by polymerisation of cyclic acetals.

Polycarbonates, containing hydroxyl groups, which can be used are those of a type which is in itself known, which can be prepared, for example, by reaction of diols such as 1,3-propanediol, 1,4-butanediol and/or 1,6-hexanediol, diethylene glycol, thriethylene glycol or tetraethylene glycol with diaryl carbonates, for example diphenyl carbonate or phosgene.

The polyester-amides and polyamides include, for example, the predominantly linear condensates obtained from polybasic saturated and unsaturated carboxylic acids or their anhydrides and polyfunctional saturated and unsaturated aminoalcohols, diamines, polyamines and their mixtures.

Polyhydroxy compounds which already contain urethane groups or urea groups, and optionally modified natural polyols, such as castor oil, carbohydrates and starch, can also be used. Addition products of alkylene oxides to phenolformaldehyde resins or to urea-formaldehyde resins can also be employed according to the invention.

Examples of these compounds to be used according to the invention are described, for example, in High Polymers, volume XVI, "Polyurethanes, Chemistry and Technology", edited by Saudners-Frisch, Interscience Publishers, New York, London, volume I, 1962, pages 32–42 and pages 44–54 and volume II, 1964, pages 5–6 and 198–199, and also in the Kunststoff-Handbuch, volume VII, Vieweg-Hochtlen, Carl-Hanser-Verlag, Munich, 1966, for example on pages 45 to 71. In the process according to the invention, water can be co-used as a blowing agent.

Further, catalysts are frequently co-used in the process.

Such catalysts are of a type which is in itself known, for example, tertiary amines, such as triethylamine, tributylamine, N-methyl-morpholine, N-ethyl-morpholine, N-coco-morpholine, N,N,N',N'-tetramethylethylenediamine, 1,4-diaza-bicyclo-(2,2,2)-octane, N-methyl-N'-dimethylaminoethyl-piperazine, N,N-dimethylbenzylamine, bis-(N,N-diethylaminoethyl) adipate, N,N-diethylbenzylamine, pentamethyldiethylenetriamine, N,N-dimethylcyclohexylamine, N,N,N',N'-tetramethyl-1,3-butanediamine, N,N-dimethyl-β-phenylethylamine, 1,2-dimethylimidazole and 2-methylimidazole.

Examples of tertiary amines which contain hydrogen atoms which are active towards isocyanate groups are triethanolamine, triisopropanolamine, N-methyl-diethanolamine, N-ethyl-diethanolamine, N,N-dimethylethanolamine and their reaction products with alkylene oxides, such as propylene oxide and/or ethylene oxide.

Further catalysts which can be used are sila-amines with carbon-silicon bonds, such as are described, for example, in German Patent Specification No. 1,229,290, for example 2,2,4-trimethyl-2-silamorpholine and 1,3-diethylaminomethyl-tetramethyl-disiloxane.

Nitrogen-containing bases such as tetraalkylammonium hydroxides, and also alkali metal hydroxides such as sodium hydroxide, alkali metal phenolates such as sodium phenolate or alkali metal alcoholates such as sodium methylate can also be used as catalysts. Hexahydrotriazines can also be employed as catalysts.

Organic metal compounds, especially organic tin compounds, may also be used as catalysts.

Preferred organic tin compounds which can be used are tin(II) salts of carboxylic acids such as tin(II) acetate, tin(II) octoate, tin(II) ethylhexoate and tin(II) laurate and the dialkyl-tin salts of carboxylic acids, such as, for example, dibutyl-tin diacetate, dibutyl-tin dilaurate, dibutyl-tin maleate or dioctyl-tin diacetate. Further examples of catalysts to be used in the process according to the invention, and details of the mode of action of the catalysts, are described in the Kunststoff-Handbuch, volume VII, published by Vieweg and Hochtlen, Carl-Hanser-Verlag, Munich 1966, for example on pages 96 to 102.

As a rule, the catalysts are employed in an amount of between about 0.001 and 10% by weight, based on the amount of compounds which contain at least two hydrogen atoms which are reactive towards isocyanates and have a molecular weight of 400 to 10,000.

Surface-active additives (emulsifiers and foam stabilisers) can also be co-used. Examples of possible emulsifiers are the sodium salts of castor oil sulphonates or of fatty acids or salts of fatty acids with amines such as diethylamine oleate or diethanolamine stearate. Alkali metal salts or ammonium salts of sulphonic acids, such as, say, of dodecylbenzenesulphonic acid or dinaphthylmethanedisulphonic acid, or of fatty acids such as ricinoleic acid or of polymeric fatty acids can also be co-used as surface-active additives.

Foam stabilisers which can be used are, above all, polyether-siloxanes. The structure of these compounds is generally such that a copolymer of ethylene oxide and propylene oxide is bonded to a polydimethylsiloxane radical. Such foam stabilisers are described, for example, in U.S. Patent Specification No. 2,764,565.

Reaction retarders, for example compounds which have an acid reaction, such as hydrochloric acid or organic acid halides, can also be co-used, as can cell regulators of the type which is in itself known, such as paraffins or fatty alcohols or dimethylpolysiloxanes, as well as pigments or dyestuffs and flameproofing agents of the type which is in itself known, for example tris-chloroethyl phosphate or ammonium phosphate and ammonium polyphosphate, as well as aging stabilisers and weathering stabilisers, plasticisers and fungistatic and bacteriostatic substances, and fillers such as barium sulphate, hydrated aluminium hydroxide, kieselguhr, carbon black or whiting.

Further examples of surface-active additives and foam stabilisers, cell regulators, reaction retarders, stabilisers, flameproofing substances, plasticisers, dyestuffs and fillers and fungistatic and bacteriostatic substances, which can optionally be co-used according to the invention, and details of the use and mode of action of these additives, are described in the Kunststoff-Handbuch (Plastics Handbook), volume VI, published by Vieweg and Hochtlen, Carl-Hanser-Verlag Munich 1966, for example on pages 103 to 113.

The reactants are reacted in accordance with the one-step process which is in itself known, the prepolymer process or the semi-prepolymer process.

C. Crosslinkable acrylate and methacrylate resins

These can also be used as reaction resins in the process of the invention. They are combinations of monoacrylates and/or monomethacrylates, in combination with dimethacrylates and oligomethacrylates and, optionally, polymeric acrylates, methacrylates and their copolymers of very diverse degrees of polymerisation, with or without functional groups, (such as, for example, double bonds), which are capable of participating in the polymerisation or copolymerisation when the foam is being cured. The polymers of this class of compound to be used according to the invention are described, for example, in Methoden der Organischen Chemie (Methods of Organic Chemistry) (Houben-Weyl), 4th edition, volume 14/1, Georg Thieme Verlag, Stuttgart 1962, pages 1,010–1,078.

The curing can be effected by the same radical-forming agents as the compounds mentioned for the case of the polyesters (see under F) and, optionally, amine accelerators.

D. *Isocyanurate resins* can also be used in the sense of the present invention. Examples are the isocyanurate resins mentioned in DT-PS 1,112,285, DOS (German Published Specification) No. 1,595,844 and BE-PS 697,411.

As regards practical execution, similar remarks apply as to the polyurethane intermediates. The cyclisation catalysts are preferably added to the isocyanates under pressure, optionally in combination wth up to 30% by weight of diols and/or polyols, relative to the total reaction mixture, before releasing the pressure.

E. Phenolic resins such as are described, for example, in Methoden der Organischen Chemie (Methods of Organic Chemistry) (Houben-Weyl), 4th edition, volume 14/2, Georg Thieme Verlag, Stuttgart, 1963, pages 193–291, should also be mentioned as further condensation resins.

F. A preferred embodiment consists of the use of unsaturated polyester resins, that is to say of solutions of unsaturated polyesters in copolymerisable compounds. The unsaturated polyesters to be used in the process according to the invention are prepared according to known processes by polycondensation of at least one α,β-ethylenically unsaturated dicarboxylic acid with 4 or 5 carbon atoms as a rule or its ester-forming derivatives, optionally mixed with up to 90 mol %, relative to the unsaturated acid component, of at least one aromatic, cycloaliphatic dicarboxylic acid with 8 to 10 carbon atoms and/or at least one saturated aliphatic dicarboxylic acid with 4 to 10 carbon atoms or its ester-forming derivatives, with at least one polyhydroxy compound, preferably a dihydric alcohol with 2 to 8 carbon atoms - i.e. polyesters as described by J. Bjorksten et al. in "Polyesters and their Applications", Reinhold Publishing Corp., New York 1956. Examples of unsaturated dicarboxylic acids, or their derivatives, to be used preferentially are maleic acid or maleic anhydride or fumaric acid. However, it is also possible to use, for example, mesaconic acid, citraconic acid, itaconic acid or chloromaleic acid. Examples of the aromatic, cycloaliphatic or saturated aliphatic dicarboxylic acids, or their derivatives, which are used are phthalic acid or phthalic anhydride, isophthalic acid, terephthalic acid, hexahydrophthalic acid or tetrahydrophthalic acid or their anhydrides, endomethylenetetrahydrophthalic acid or its anhydride, succinic acid or succinic anhydride anhydride and succinic acid esters and chlorides, adipic acid and sebacic acid. For the preparation of resins of low inflammability it is possible to use, for example, hexachloroendomethylenetetrahydrophthalic acid (Het-acid), tetrachlorophthalic acid, tetrabromophthalic acid, dibromoricinoleic acid or tetrabromoricinoleic acid. Flame resistance is also achievable by addition of halogen-containing compounds which are not co-condensed in the polyesters, such as, for example, chloroparaffin. Polyesters to be used preferentially contain co-condensed maleic acid radicals of which up to 25 mol % can be replaced by phthalic acid radicals or isophthalic acid radicals. Dihydric alcohols which can be employed are ethylene glycol, 1,2-propanediol, 1,3-propanediol, diethylene glycol, dipropylene glycol, 1,3-butanediol, 1,4-butanediol, 1,4-butenediol, neopentyl glycol, 1,6-hexanediol, perhydrobisphenol, the oligomers of ethylene oxide and propylene oxide, sugar alcohols and other cycloaliphatic and aromatic diols such as, for example, p-dimethylolbenzene or its isomers, and their hydrogenation products, and others. Ethylene glycol, 1,2-propanediol, diethylene glycol and dipropylene glycol are used preferentially.

Further modifications are possible by incorporation of up to 10 mol %, based on the alcohol component or acid component, of mono-, di- and tetrahydric alcohols, such as methanol, isopropanol, butanol, benzyl alcohol, cyclohexanol and tetrahydrofurfuryl alcohol, trimethylopropane and pentaerythritol and by incorporation of monobasic and tribasic acids such as benzoic acid, oleic acid, linseed oil fatty acid, ricinoleic acid, ricinenic acid, α-ethylhexanoic acid, acrylic acid, methacrylic acid, crotonic acid and trimellitic acid.

The acid numbers of the polyesters should be between 1 and 50, preferably between 5 and 25, the OH numbers should be between 10 and 100, preferably between 10 and 50, and the (number average) molecular weights should be between approx. 500 and 10,000, preferably between approx. 700 and 3,000 (up to values of 5000 measured by vapour pressure osmosis in dioxane and acetone; if both values differ from each other, the lower value is considered to be the more accurate one; above values of 5000 measured by membrane osmosis in acetone).

Suitable copolymerisable compounds in the sense of the invention, which are employed in amounts of 10 to 90, preferably 20 to 50%, by weight, relative to the sum (polyester + copolymerisable compounds), are the unsaturated compounds customary in the polyester technology, which preferably carry α-substituted vinyl groups or β-substituted allyl groups, styrene being preferred; however it is also possible to use, for example, halogenated and alkylated styrenes, in which the alkyl groups can contain 1-4 carbon atoms, such as, for example, vinyltoluene, divinylbenzene, α-methylstyrene, tert.-butylstyrene and chlorostyrenes, vinyl esters of carboxylic acids with 2-6 carbon atoms, preferably vinyl acetate; vinyl pyridine, vinylnaphthalene, vinylcycloheane, acrylic acid and methacrylic acid and/or their esters with 1-4 carbon atoms in the alcohol component, their amides and nitriles, and mixtures which additionally contain maleic anhydride, maleic acid half-esters and maleic acid diesters with 1-4 carbon atoms in the alcohol component, maleic acid half-amides and diamides or cyclic imides such as N-methylmaleimide or N-cyclohexylmaleimide; allyl compounds, such as allylbenzene and allyl esters, such as allyl acetate, allyl acrylate, allyl methacrylate, phthalic acid diallyl esters, isophthalic acid diallyl ester, fumaric acid diallyl ester, allyl carbonates, diallyl carbonates, triallyl phosphate and triallyl cyanurate.

In order to prevent undesired premature polymerisation of the polyester resins, it is advisable to add 0.001 to 0.1% by weight of polymerisation inhibitors and, optionally, antioxidants, to the resins already during their preparation.

Suitable auxiliaries of this type are, for example, phenols and phenol derivatives, preferably sterically hindered phenols, which contain alkyl substituents with 1-6 C atoms in both o-positions relative to the phenolic hydroxyl group, amines, preferably secondary arylamines and their derivatives, quinones, copper salts of organic acids, and addition compounds of copper (I) halides to phosphites, such as, for example, 4,4'-bis-(2,6-di-tert.-butylphenol), 1,3,5-trimethyl-2,4,6-tris-(3,5-di-tert.-butyl-4-hydroxy-benzyl)-benzene, 4,4'-butylidene-bis-(6-tert.-butyl-m-cresol), 3,5-di-tert.-butyl-4-hydroxy-benzyl-phosphonic acid diethyl ester, N,N'-bis-(β-naphthyl)-p-phenylenediamine, N,N'-bis-(1-methylheptyl)-p-phenylenediamine, phenyl-β-naphthylamine, 4,4'-bis-(α,α-di-methylbenzyl)-diphenylamine, 1,3,5-tris-(3,5-di-tert.-butyl-4-hydroxy-hydrocinunamoyl)-hexahydro-s-triazine, hydroquinone, p-benzoquinone, toluhydroquinone, p-tert.-butylpyrocatechol, chloranil, naphthoquinone, copper naphthenate, copper octoate, Cu(I)Cl/triphenyl phosphite, Cu(I)Cl/trimethyl phosphite, Cu(I)Cl/trischloroethyl phosphite, Cu(I)Cl/tripropyl phosphite and p-nitrosodimethylaniline. Further suitable stabilisers are described in Methoden der Organischen Chemie (Methods of Organic Chemistry) (Houben-Weyl), 4th edition, volume 14/1, pages 433–452, 756, Georg Thieme Verlag, Stuttgart, 1961. For example, p-benzoquinone used in a concentration of 0.01 to 0.05% by weight, relative to the polyester resin, is very suitable.

Polymerisation initiators used for the polyester resins are radical-forming agents, preferably organic peroxides. The polyester resins contain customary amounts, preferably 0.1 to 2.0% by weight, of polymerisation initiators. Examples of suitable initiators are diacyl peroxides such as diacetyl peroxide, dibenzoyl peroxide, di-p-chlorobenzoyl peroxide, peroxy-esters such as tert.-butyl peroxyacetate, tert.-butyl peroxybenzoate, dicyclohexyl peroxydicarbonate, alkyl peroxides such as bis-(tert.-butyl peroxybutane), dicumyl peroxide, tert.-butyl cumyl peroxide, hydroperoxides, such as cumene hydroperoxide and tert.-butyl hydroperoxide, ketone peroxides such as cyclohexanone hydroperoxide, methyl ethyl ketone hydroperoxide and acetylacetone peroxide, or azoisobutyrodinitrile. However, inorganic radical forming agents, such as, for example, hydrogen peroxide and potassium peroxydisulphate or ammonium peroxydisulphate can also be used.

Examples of suitable accelerators, which are generally employed in amounts of 0.05–0.2% by weight, relative to the polyester resin, are amines, such as diethylaniline, dimethylaniline, N,N-diethoxyaniline and N,N-dipropoxyaniline and -p-toluidine and bis-($\beta$-hydroxypropyl)-p-toluidine polyadipate, and metal salt accelerators such as cobalt naphthenate and cobalt octoate and vanadyl p-toluenesulphonate, optionally in conjunction with thioglycollic acid esters, such as are described, for example, in DOS (German Published Specification) No. 2,025,410.

The viscosity of the reaction resins and/or condensation resins to be used according to the invention is less than 6,000 cP, and preferably between 800 and 4,000 cP. The resins can contain 0.1–10% by weight, based on the amount of resin, of additives which influence the viscosity, especially the structural viscosity, such as, for example, hydrogenated castor oil, highly disperse silicas, polyethylene powders and the like. Furthermore, the reactive resins and/or condensation resins can contain 1 to 100% by weight, based on the amount of resin, of liquid or solid additives which are responsible for, or improve, the low inflammability and period of flame resistance, such as, for example, antimony trioxide, zinc borate, hydrated aluminium hydroxide and others.

It is advantageous to co-use surface-active substances which, individually or as mixtures, influence the foaming, the foam density, the foam stability, the wetting (for example of the fillers) and the foam structure (fineness of pores, open cells or closed cells). As such substances, it is possible to use anionic or cationic detergents and/or non-ionic surface-active substances, such as, for example, turkey red oil, quaternary ammonium salts, ethylene oxide/propylene oxide polymers, ethylene oxide and/or propylene oxide and/or butene oxide homopolymers and/or copolymers and/or their monoalcohol ethers, and thermoplastics which are soluble and/or swellable in the reactive resin mixture, particularly in the copolymerisable monomers, but in particular organic silicon compounds, for example siloxanes containing ethylene oxide or propylene oxide, which are employed by themselves or, preferably, in combination with one of the abovementioned surface-active substances or with a mixture of such substances. The amount of the foam-influencing agents can be 0.1–20%, preferably 0.5–3%, relative to the amount of resin.

The reaction resins and/or condensation resins can furthermore contain 0.1 to 50% by weight, relative to the amount of resin, of soluble organic dyestuffs and organic and inorganic pigments, and 1 to 2,000% by weight, preferably 1–300% by weight, relative to the amount of resin, of fillers and reinforcing agents in a pulverulent, fibrous, gritty or granular form; in the case of fibrous or granular fillers and reinforcing agents, these are preferably combined with the foaming mixture during or after the foaming process.

A preferred embodiment is a combination of the expanded reaction resin mixtures with organic and/or inorganic lightweight fillers of particle size diameter 1–200 mm or above, but predominantly 2–30 mm. Possible lightweight fillers are: thermoplastics and/or thermosetting resins which are resistant to the reaction mixture up to curing, and/or hollow glass spheres and/or foam granules and/or expanded glass, expanded clay, expanded slate, pumice/tufa, perlite (expanded volcanic rock), aerated concrete fragments and cellular glass fragments as well as mixtures of these lightweight fillers and optionally also heavier fillers, such as, for example, calcium carbonate, dolomite, quartz sand and grit, and other silicate products of the same or substantially smaller particle size, for example in the range of $1\mu$–200 mm and, if appropriate, larger still.

Examples of suitable blowing agents are air, carbon dioxide, helium, argon nitrogen volatile hydrocarbons, for example propane, butane, volatile halogenated hydrocarbons, such as, for example, $CClF_3$, $CHClF_2$ and $CCl_2F_2$. A preferred blowing agent is carbon dioxide, since it shows the greatest rate of absorption in the case of most resins; the use of carbon dioxide therefore as a rule makes it possible to work with relatively low pressures.

The characterising feature of the invention, the enlarging of the gas-liquid interface, can, in one embodiment, be brought about by fitting a gas distribution device in a reaction vessel which does not possess a stirring device.

A simplified representation of an industrial apparatus suitable for the discontinuous and intermittent manufacturing process is shown in FIG. 1. A pressure vessel 31, with a removable flanged lid 32, is partially filled (for example to ⅔ of its volume) with reactive resin and/or condensation resin, via the feed device (319). Blowing gas flows, from a stock cylinder 35 containing a blowing gas and provided with a manometer 36 and a valve 37, through feed pipeline 33 and a distributor (spray ring) 34 into the pressure vessel, the nozzles provided as outlet orifices for the gas being smaller than 1 mm, so that the gas bubbles into the resin. The gas bubbles rise through the resin in the direction of the surface and are partially or completely absorbed by the resin. A gas pressure cushion forms above the resin, and from this cushion gas also diffuses into the resin.

When the pressure in the pressure vessel has risen to the desired pressure as a result of the gas which continues to flow in (the pressure can be read off on the manometer 38), the overflow valve (39) opens and the pressure is kept constant. After a certain residence time, the resin has absorbed the desired proportion of gas. The requisite residence time primarily depends on the pressure in the system.

Before the end of the residence time, the valve 37 is closed to provide a quiescence time, during which any gas bubbles present are absorbed or can reach the surfaces.

When, after a quiescence time, all the gas present in the resin has either risen to the surface or been absorbed by the resin, the valve 316 can be opened. During and after the release of the pressure acting on the resin solution, a uniform fine-pore foam 318 is produced. To cure the foam, an appropriate curing agent or resin/curing agent mixture is introduced into the mixing chamber 312.

The amount of curing agent is metered in from the stock vessel 315 (of which the pressure can be read off on the manometer 313), for example via an adjustable pump 314, in accordance with the pressure in the outlet pipeline (which can be read off on the manometer 311).

In order to fill various moulds with reactive resin foam, a flexible pressure hose 317 is interposed between the mixing chamber 312 and the orifice valve 316.

A preferred embodiment of the device for carrying out the process according to the invention which can be used is one in which the pressure vessels contain, instead of a gas distributor device, inserts which enlarge the surface and over which the resins flow, a thickness of layer which depends on the viscosity of the resin and on the shape of the surface of the inserts being formed under the action of gravity. The resin layer thus formed absorbs the blowing gas so rapidly under the given pressure that the resin which runs off can immediately be withdrawn from the pressure vessel, subjected to pressure release and cured. This embodiment is therefore most suitable for a continuous procedure.

Figure 2:
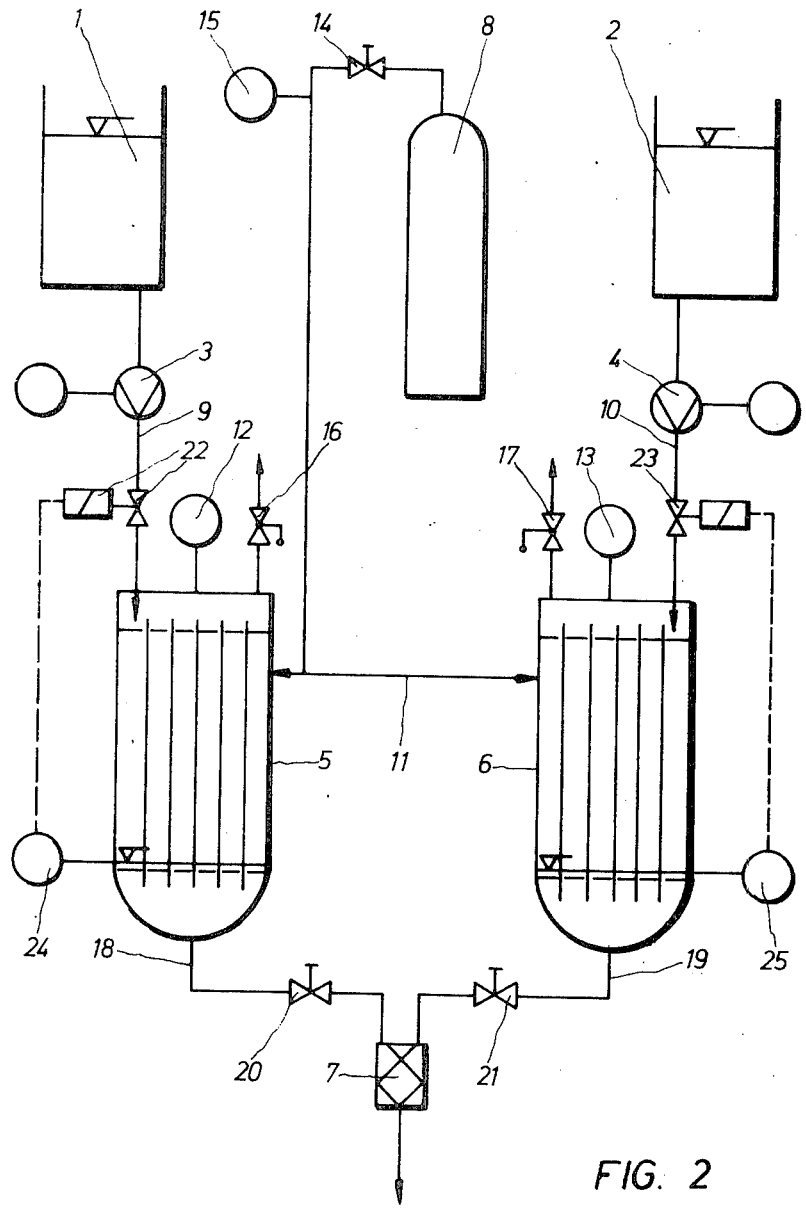

An industrial apparatus preferred for the continuous manufacturing process is shown in simplified representation in FIG. 2.

The total apparatus consists of 2 stock vessels, 2 pumps, 2 pressure vessels with inserts, a mixing chamber and one or more gas supply cylinders, for example $CO_2$ cylinders. The gas cylinders can also be replaced by a suitable compressor.

In the stock vessel 1 there is a foamable reactive resin, preferably an unsaturated polyester resin, in which a curing agent is dissolved. In vessel 2 there is a corresponding resin in which an accelerator is dissolved or incorporated. Both resins are brought to a relatively high pressure in pumps. The pumps which can be used for this purpose are all customary types of pumps suitable for conveying such viscous organic substances and at the same time capable of building up a sufficiently high pressure.

Figure 3:
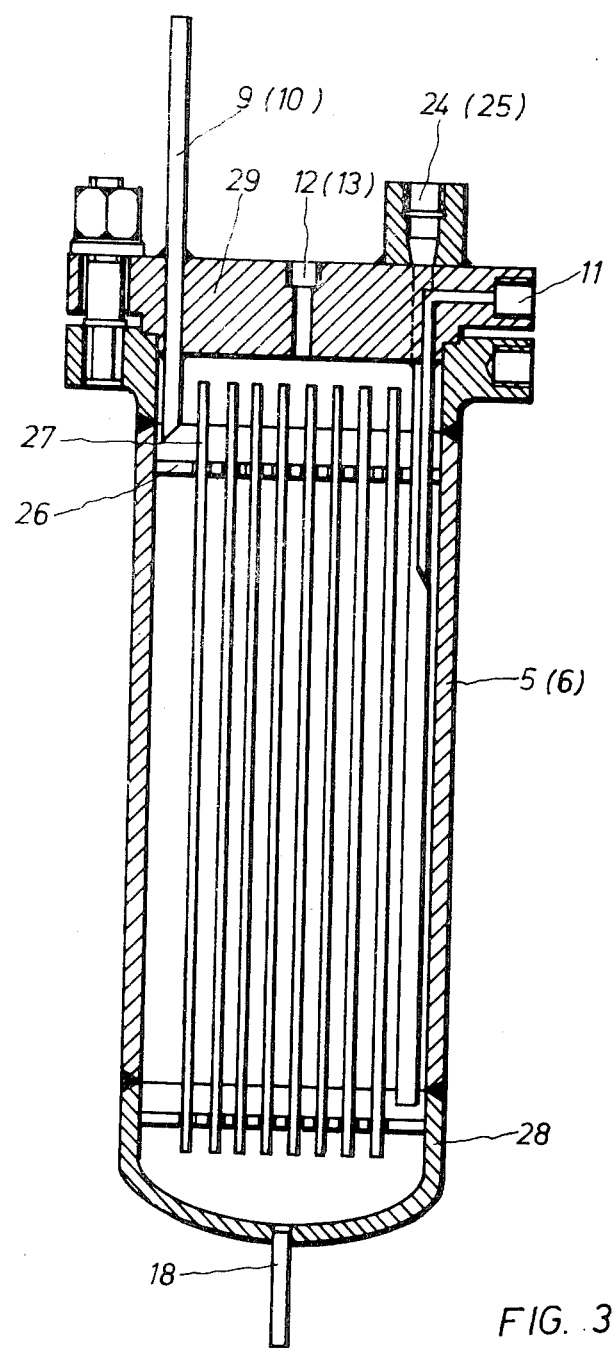

The resin is conveyed through the pipelines 9 and 10 into the two pressure vessels 5 and 6. The pressure vessels 5 and 6 are drawn in more detail in FIG. 3. The vessel consists of a pressure pipe with a welded-on base 28 and a flanged lid 29 (FIGS. 2 and 3). Connections are provided for the resin (9 or 10) (see FIGS. 2 and 3), for the gas (11) and for the pressure relief valve 16 and 17. The insert consists of a distributor bottom 26 and several plates 27 down which the mixture drains. At the bottom, there is an outlet 18 and 19 to which a flexible pressure hose can be connected. A capacitive probe 24 and 25 is fitted for the purpose of measuring the level of the contents. The resin passes via pipeline 9 and 10 into the pressure vessels, and runs, if the throughput is low, as a thin film down the plate nearest the inlet orifice, in the direction of the bottom. If the throughput is increased, the end of the drain-down plate which projects above the distributor bottom forms an overflow weir. Hence an additional thin film forms first on the rear of the first drain-down plate and secondly on the front of the next drain-down plate. The second plate end forms the overflow weir if the throughput is increased further, and so on. On all the wetted plates, regardless of their total number, practically identical films form in accordance with the resin throughput.

The resin drains down the plates as coherent films and collects, free from bubbles, at the bottom of the particular pressure vessel. The two pressure vessels 5 and 6 are under the same static gas pressure which is adjusted, for example, by means of the gas stock cylinder or cylinders (8) and reducing valve (14), via the shared feed pipeline (11). The pressure of the gas can be read off on the manometer (15). A safety valve (16/17) is mounted on each of the pressure vessels. The pressures in the vessels can be read off on the manometers 12 and 13.

The resin solutions which have been enriched with gas, or saturated with gas, depending on the pressure, leave the pressure vessel through the pipelines 18 and 19 and pass into a mixing cell (7) in which the two components mix thoroughly.

The pressure is released by means of the manually electrically or pneumatically actuated valves 20 and 21, via the mixing passages, for example down to normal atmospheric pressure, resulting in the formation of the foam.

If the valve 20 and/or 21 are closed, the resin level in the pressure vessels 5 and/or 6 rises until, for example, a capacitive level measuring probe 24 and/or 25 responds and closes the solenoid valves 22 and/or 23. As a result, the pressure in the pipeline 9 and/or 10 upstream from the solenoid valve rises to the point that the pressure relief device of the pumps 3 and/or 4 responds and interrupts the feed. If the valve 20 and/or 21 is opened, the resin level in the pressure vessels drops correspondingly and the valve 22 and/or 23 opens. The pump 3 and/or 4 restarts.

In principle there are, of course, two possible methods of curing:

1. In the case of a long pot life, the curing agent (optionally together with accelerator) can already be added to the reactive resin or condensation resin in the pressure vessel.

2. In the case of a short pot life it is advisable to divide the total system into two non-curing components and only to mix these shortly before the pressure is released. Thus, for example, in the case of the polyurethane intermediates it is possible to enrich, on the one hand, the polyol component, and on the other, the polyisocyanate component, with gas in accordance with the process of the invention, and then to combine the two components and release the pressure.

EXAMPLES

In the processes of the examples which follow, the temperature was in each case 22° C.

EXAMPLE 1

Process using the device according to FIG. 1 (volume of pressure vessel: 2,000 cm$^3$, charge volume 1,600 cm$^3$).

EXAMPLE 1.1

An unsaturated polyester resin was prepared from 0.496 mol of maleic anhydride, 0.504 mol of phthalic anhydride and 1.066 mol of 1,3-butanediol by polycondensation in a known manner at 100°–200° C. until an acid number <30 was reached, and was then stabilised with 0.01% of hydroquinone, diluted with styrene to a viscosity of 3,000 cP and pretreated with an accelerator by adding 2.5% by weight, relative to the total solution, of bis-($\beta$-hydroxypropyl)-p-toluidine polyadipate.

1% by weight of organopolysiloxane/polyalkylene oxide copolymer and 2% by weight of a 50% strength by weight solution of the sodium salt of sulphonated castor oil in distilled water were added to this solution. Curing was carried out in a known manner with 3.6% by weight of a commercially available benzoyl peroxide dispersion (40% strength by weight in dioctyl phthalate). The peroxide was added after the gas-enriched mixture issued from pipe 10 (FIG. 1).

Blowing gas: carbon dioxide

| Pressure [bars] | Residence time [mins] | fl. foam after pressure release, density [g/l] |
|---|---|---|
| 5 | 60 | 300 |
| 5 | 120 | 190 |
| 10 | 20 | 365 |
| 10 | 60 | 125 |
| 20 | 20 | 120 |
| 20 | 60 | 78 |
| 30 | 5 | 340 |
| 30 | 20 | 95 |
| 40 | 5 | 225 |
| 40 | 10 | 170 |
| 50 | 5 | 120 |
| 50 | 20 | 80 |
| 50 | 120 | 32 |

EXAMPLE 1.2

The resin employed was the polyester resin described under 1.1:

Blowing gas: air

| Pressure [bars] | Residence time [mins] | Density [g/l] |
|---|---|---|
| 50 | 60 | 450 |
| 50 | 240 | 380 |
| 100 | 60 | 350 |
| 100 | 120 | 410 |
| 130 | 120 | 400 |
| 130 | 300 | 290 |

The fluid as yet uncured foam only collapsed after 120–240 minutes.

EXAMPLE 1.3

The resin employed was the polyester resin described under 1.1.

Blowing gas: nitrogen

| Pressure [bars] | Residence time [mins] | Density [g/l] |
|---|---|---|
| 170 | 30 | 600 |
| 170 | 60 | 600 |
| 170 | 120 | 400 |

EXAMPLE 1.4

The resin employed was the polyester resin described under 1.1.

Blowing gas: helium

| Pressure [bars] | Residence time [mins] | Density [g/l] |
|---|---|---|
| 100 | 120 | 700 |
| 100 | 240 | 660 |

EXAMPLE 1.5

The resin employed was the polyester resin described under 1.1.

| Blowing gas | difluoromonochloromethane | |
|---|---|---|
| Pressure [bars] | Residence time [mins] | Density [g/l] |
| 10 | 10 | 66 |
| 10 | 30 | 130 |

EXAMPLE 1.6

Foams were prepared in accordance with Examples 1.2, 1.3 and 1.4 from the polyester resin according to Example 1.1, but initially without added peroxide. After releasing the pressure, benzoyl peroxide paste, to correspond to Example 1.1, was added to the fluid foam by stirring-in.

Surprisingly, it was found that in spite of the mechanical stirring-in the fine foam structure remained preserved until the reactive resin gelled.

EXAMPLE 1.7

A polyester resin according to Example 1.1, but without added amine and instead with 0.03% by weight, relative to "metallic cobalt (in the form of cobalt naphthenate) and PE resin" and with 3% by weight of methyl ethyl ketone peroxide (50% strength by weight in dimethyl phthalate) was foamed analogously to Examples 1.1 to 1.6. The gelling time was 7 minutes depending on the blowing gas and on the density of the foam.

EXAMPLE 1.8

The resin employed was the polyester resin according to Example 1.1. 80 parts by weight, relative to 100 parts by weight of reactive resin, of a talc of particle size predominantly 20–150 μm were added to the resin. The foaming was carried out analogously to Example 1.1.

Blowing gas: carbon dioxide

| Pressure [bars] | Residence time [mins] | Density [g/l] |
|---|---|---|
| 50 | 60 | 720 |
| 50 | 180 | 590 |

EXAMPLE 1.9

Foams were prepared from a polyester resin according to Example 1.1, analogously to Example 1.6. The foams were combined with a lightweight filler (expanded gas, particle size 10–30 mm, with densities of 150–180 kg/cm$^3$) by mixing-in. The overall density of the resulting foam lightweight concrete was 400–900 g/l.

EXAMPLE 1.10

3% by weight of benzoin isopropyl ether were added to the polyester resin according to Example 1.1, but without added amine and without added peroxide. The uncured foam was knife-coated, as a layer approx. 15 mm thick, onto a plane base, covered with polyester film and exposed to superactinic fluorescent lamps with a high proportion of UV light (365 μm) at 10 cm distance for 20 minutes at 40° C. The resulting foam slab showed a strong integral structure effect and had a density of 110 g/l.

EXAMPLE 1.11

A polyester resin according to Example 1.1, but without peroxide, was treated for 20 hours in the device according to FIG. 1, at 6 bars carbon dioxide pressure. The reactive resin/gas mixture was transferred into a 1 l spray can and the pressure was released after 1 week. Density 180 g/l.

EXAMPLE 1.12

The polyester resin according to Example 1.10 was treated analogously to Example 1.11.

The reaction mixture was transferred into a spray can and the pressure was released not earlier than the next day.

The curing can be effected as described in 1.10, with superactinic fluorescent lamps or other lamps which emit light of high UV content.

EXAMPLE 1.13

A reactive resin according to Example 1.1 was formed at 50 atmospheres gauge after a dwell time of 20 minutes.

The foam was introduced by means of a perforated lance of rigid PVC into moulds which were first filled with cellular glass of particle size 10–30 mm. The mould size was 40 × 25 × 10 cm. The resulting rigid foam composite material had a density of 225 g/l.

EXAMPLE 2

Continuous manufacture of insulating materials from reactive resins:

EXAMPLE 2.1

A polyester resin according to Example 1.1 is introduced into the vessel 1 (FIG. 2), but without amine, and commercially available benzoyl peroxide paste (50% strength in dioctyl phthalate) is added in a known manner. The weight ratio of peroxide to reactive resin was 3:100.

In vessel 2, accelerator is added beforehand, in a known manner, to a reactive resin corresponding to Example 1.1, by using 5 parts by weight of a 10% strength by weight solution of bis-($\beta$-hydroxypropyl)-p-toluidine polyadipate per 100 parts by weight of resin.

Viscosity of the resin: 2,600 cP (adjusted by means of additional styrene).

$CO_2$ pressure in the pressure vessels: 45 bars.
Throughput: 1 kg/minute.
Mixing zone and valves (see FIG. 2), 7, 20 and 21: two-component high pressure spray gun or casting gun as used in the lacquering trade.
Temperature: 22° C.
Foam after release of pressure:
Density: 110 g/l
Time up to gelling of the foam: 5 minutes 30 seconds.

EXAMPLE 2.2

An unsaturated polyester was prepared from 0.83 mol of maleic anhydride, 0.17 mol of phthalic anhydride, 0.851 mol of 1,2-propanediol and 0.269 mol of dipropylene glycol by polycondensation until an acid number of 28 was reached. The polyester was diluted with styrene to give a 65% strength by weight solution and this solution was stabilised with 0.012% by weight of hydroquinone. The curing agent and accelerator were added as in Example 2.1. The polyester solution was then diluted to the viscosities indicated below by further addition of styrene.

Mixing zones and valves: see FIG. 2: 7, 20 and 21: two-component high pressure spray gun or casting gun as used in the lacquering trade.
Time up to gelling 6–10 minutes.
Viscosity: 1,200 mPas

| $CO_2$ pressure [bars] | Throughput [kg/min] | Density [kg/m³] |
| --- | --- | --- |
| 25 | 2.5 | 180 |
| 30 | 1.4 | 120 |
| 40 | 1.4 | 115 |

Viscosity: 1,200 mPas

| $CO_2$ pressure [bars] | Throughput [kg/min] | Density [kg/m³] |
| --- | --- | --- |
| 25 | 4 | 165 |
| 30 | 2.7 | 100 |
| 40 | 3.1 | 95 |

Viscosity: 800 mPas

| $CO_2$ pressure [bars] | Throughput [kg/min] | Density [kg/m³] |
| --- | --- | --- |
| 25 | 2.3 | 114 |
| 30 | 3 | 92.5 |
| 40 | 3.3 | 100 |

EXAMPLE 2.3

Vessel 2 contains a reactive resin analogous to Example 2.2.

The apparatus is charged under the same conditions as described in Example 2.2, but the gas/reaction mixture is injected near the bottom of a mould of size 40 × 25 × 10 cm which has been filled with cellular glass of 10 × 30 mm particle size, the pressure is released, and the mixture is cured.

Viscosity: 1,200 mPas

| $CO_2$ pressure [bars] | Throughput [kg/min] | Density [kg/m³] | Binder required [kg/m³] |
| --- | --- | --- | --- |
| 30 | 1.7 | 286 | 112 |
| 40 | 1.9 | 266 | 92 |

Viscosity: 1,000 mPas

| $CO_2$ pressure [bars] | Throughput [kg/min] | Density [kg/m³] | Binder required [kg/m³] |
| --- | --- | --- | --- |
| 25 | 1.2 | 280 | 106 |
| 30 | 1.8 | 265 | 91 |
| 40 | 2.5 | 258 | 84 |

Viscosity: 800 mPas

| $CO_2$ pressure [bars] | Throughput [kg/min] | Density [kg/m³] | Binder required [kg/m³] |
| --- | --- | --- | --- |
| 25 | 1.8 | 265 | 91 |
| 30 | 1.8 | 262 | 88 |
| 40 | 3.8 | 274 | 100 |

We claim:

1. A process of manufacturing foamed materials from a liquid thermosetting resin having a viscosity less than 6000 cP, comprising the steps of contacting a thin unbroken film of the liquid resin in a pressure vessel under pressure of 3 to 350 bars at a temperature of between 0° to 50° C. for a residence time of 0.1 to 120 minutes with a blowing agent having a boiling point under normal pressure which is below 0° C., causing the liquid resin to smoothly flow without absorbing discernible bubbles of the blowing agent down and over an elongated surface means having a vertical component disposed within the pressure vessel whereby the liquid resin film absorbs the blowing agent so rapidly that the resin film flowing off from the elongated surface means can immediately be withdrawn from the pressure vessel, deposited on a surface, subjected to pressure release, allowed to expand and to cure into a foamed resin.

2. The process as set forth in claim 1, wherein the liquid resin is caused to flow over a series of vertically disposed smooth plates in the pressure vessel by disposing the series of plates vertically in the pressure vessel with their upper ends passing through substantially closed apertures in a horizontal distributing bulkhead, the upper ends of the plates constituting overflow weirs within the pressure vessel, the liquid resin being supplied in front of the first overflow weir whereby liquid film first flows down the front and then the back surfaces of the first plate and thereafter down the following front and back surfaces of successive plates as the liquid resin builds up on the bulkhead and flows successively over each of the weirs.

3. The process of claim 1 wherein the liquid resin contacted in said pressure vessel contains at least one member selected from the group consisting of curing agents, accelerators and fillers.

* * * * *